(12) United States Patent
Roy et al.

(10) Patent No.: US 11,089,626 B2
(45) Date of Patent: Aug. 10, 2021

(54) LISTEN BEFORE TALK AND CHANNEL ACCESS PRIORITY CLASS FOR PUCCH IN NEW RADIO UNLICENSED

(71) Applicant: MediaTek Singapore Pte. Ltd., Singapore (SG)

(72) Inventors: Abhishek Roy, San Jose, CA (US); Pavan Santhana Krishna Nuggehalli, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/577,133

(22) Filed: Sep. 20, 2019

(65) Prior Publication Data

US 2020/0100285 A1    Mar. 26, 2020

Related U.S. Application Data

(60) Provisional application No. 62/736,510, filed on Sep. 26, 2018.

(51) Int. Cl.
*H04W 74/08* (2009.01)
*H04W 16/14* (2009.01)
*H04W 72/04* (2009.01)
*H04W 72/12* (2009.01)
(Continued)

(52) U.S. Cl.
CPC ....... *H04W 74/0808* (2013.01); *H04L 1/0026* (2013.01); *H04L 1/1819* (2013.01);
(Continued)

(58) Field of Classification Search
CPC ............. H04W 74/0808; H04W 16/14; H04W 72/0413; H04W 72/1268; H04W 28/0268;
(Continued)

(56) References Cited

U.S. PATENT DOCUMENTS

2016/0309498 A1    10/2016    Luo et al. ................. 370/329
2017/0238342 A1    8/2017    Yang et al.
(Continued)

OTHER PUBLICATIONS

International Search Report and Written Opinion of International Search Authority for PCT/US19/52357 dated Dec. 13, 2019 (16 pages).
(Continued)

*Primary Examiner* — Brian T O Connor

(74) *Attorney, Agent, or Firm* — Imperium Patent Works; Zheng Jin

(57) ABSTRACT

A method for determining Listen Before Talk (LBT) type and Channel Access Priority Class (CAPC) for Physical Uplink Control Channel (PUCCH) transmission in 5G New Radio-Unlicensed (NR-U) is proposed. Major uplink control information (UCI) transmitted over PUCCH are: (a) Scheduling Request (SR), (b) ACK/NAK (when no UL data to transmit), and (c) Channel State Information (CSI) Report (periodic). In one embodiment, UE selects Category 4 LBT for all PUCCH transmissions as Category 4 LBT offers fairness with other unlicensed network nodes. In another embodiment, UE selects either Category 4 LBT or Category 2 LBT or a mix of Category 2 and Category 4 for PUCCH transmission depending on the PUCCH format. In yet another embodiment, for Category 4 LBT, UE determines CAPC based on the associated UCI content.

20 Claims, 3 Drawing Sheets

(51) Int. Cl.
    *H04L 5/00*           (2006.01)
    *H04L 1/00*           (2006.01)
    *H04W 28/02*        (2009.01)
    *H04L 1/18*           (2006.01)

(52) U.S. Cl.
    CPC ........... *H04L 5/0055* (2013.01); *H04W 16/14* (2013.01); *H04W 28/0268* (2013.01); *H04W 72/0413* (2013.01); *H04W 72/1268* (2013.01)

(58) Field of Classification Search
    CPC .......... H04W 72/1284; H04W 74/0875; H04L 5/0055; H04L 1/0026; H04L 1/1819; H04L 5/0053; H04L 27/0006
    See application file for complete search history.

(56) References Cited

U.S. PATENT DOCUMENTS

| | | |
|---|---|---|
| 2017/0318595 A1 | 11/2017 | Dinan et al. |
| 2018/0007716 A1 | 1/2018 | Wu |
| 2018/0092073 A1 | 3/2018 | Nogami et al. |
| 2018/0255578 A1 | 9/2018 | Kim et al. |
| 2019/0014596 A1* | 1/2019 | Yang .................... H04W 72/085 |
| 2019/0098658 A1* | 3/2019 | Noh ........................ H04L 5/0055 |
| 2019/0159191 A1* | 5/2019 | Kim ...................... H04W 72/0406 |
| 2019/0174542 A1* | 6/2019 | Lei ...................... H04W 74/0816 |
| 2019/0253219 A1* | 8/2019 | Fan ......................... H04L 5/0037 |
| 2020/0137780 A1* | 4/2020 | Kim ........................ H04L 5/0007 |
| 2020/0260490 A1* | 8/2020 | Pang ........................ H04W 72/04 |
| 2020/0267694 A1* | 8/2020 | Zhang .................. H04W 74/0808 |
| 2020/0287671 A1* | 9/2020 | Hooli ....................... H04L 5/026 |
| 2020/0287691 A1* | 9/2020 | Baldemair ............ H04L 1/1854 |
| 2020/0305090 A1* | 9/2020 | Jeon .................... H04W 52/146 |
| 2021/0007143 A1* | 1/2021 | Zhou .................... H04W 74/006 |

OTHER PUBLICATIONS

Taiwan IPO, office action for related TW patent application 108134359 (no English translation is available) dated Sep. 30, 2020 (7 pages).

* cited by examiner

LISTEN BEFORE TALK AND CHANNEL ACCESS PRIORITY CLASS FOR PUCCH IN NEW RADIO UNLICENSED

CROSS REFERENCE TO RELATED APPLICATIONS

This application claims priority under 35 U.S.C. § 119 from U.S. Provisional Application No. 62/736,510, entitled "LBT Type and CAPC for PUCCH in NR-U," filed on Sep. 26, 2018, the subject matter of which is incorporated herein by reference.

TECHNICAL FIELD

The disclosed embodiments relate generally to wireless network communications, and, more particularly, to physical uplink control channel (PUCCH) design in new radio unlicensed (NR-U) wireless communications systems.

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. One suggested solution is to use a combination of licensed spectrum and unlicensed spectrum. This solution is referred to as "Licensed Assisted Access" or "LAA". In such a solution, an established communication protocol such as LTE and 5G New Radio (NR) can be used over the licensed spectrum to provide a first communication link, and LTE can also be used over the unlicensed spectrum to provide a second communication link.

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipment (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random access channel (PRACH) is used for non-contention based RACH on an LAA carrier.

Listen-Before-Talk (LBT) is a technique used in radio communications, whereby radio transmitters first sense its radio environment (channel) before it starts any transmission. LBT can be used by a radio device to find a channel the device is allowed to operate on or to find a free radio channel to operate on. In New Radio-Unlicensed (NR-U), any downlink and uplink access have to follow the LBT channel access procedure, as unlicensed frequencies are also used by other networks such as WiFi. 3GPP has classified different LBT schemes according to four different LBT categories.

The selection of LBT categories goes hand-in-hand with determining a suitable Channel Access Priority Class (CAPC). While there have been recent proposals for LBT and CAPC for user plane (UL and DL) data transmission, LBT and CAPC for control channels also need to be discussed and resolved. 3GPP has introduced four different channel access priority classes for LTE LAA. Naturally, selecting the proper LBT type and determining a suitable CAPC is very important for transmission and reception of control messages in NR-U. Note that LBT category needs to be selected in such a way that it provides fairness with other unlicensed networks such as WiFi. Similarly, CAPC should be determined depending on the priority of the message, so that higher priority messages are assigned with higher priority CAPC (lower CAPC values).

PUCCH is the uplink physical channel that carries UCI (Uplink Control Information). Major information transmitted over PUCCH are: (a) Scheduling Request (SR), (b) ACK/NAK (when no UL data to transmit), and (c) Channel State Information (CSI) Report (periodic). 3GPP has defined multiple PUCCH formats for carrying SR, HARQ Ack/NACK, and CSI Report or a combination of these information. The size of the UCI also varies from one format to another. A solution is sought to allow UE to select a suitable LBT category and to determine an efficient CAPC for PUCCH transmission in 5G NR-U wireless communication network.

SUMMARY

A method for determining Listen Before Talk (LBT) type and Channel Access Priority Class (CAPC) for Physical Uplink Control Channel (PUCCH) transmission in 5G New Radio-Unlicensed (NR-U) is proposed. Major uplink control information (UCI) transmitted over PUCCH are: (a) Scheduling Request (SR), (b) ACK/NAK (when no UL data to transmit), and (c) Channel State Information (CSI) Report (periodic). In one embodiment, UE selects Category 4 LBT for all PUCCH transmissions as Category 4 LBT offers fairness with other unlicensed network nodes. In another embodiment, UE selects either Category 4 LBT or Category 2 LBT or a mix of Category 2 and Category 4 for PUCCH transmission depending on the PUCCH format. In yet another embodiment, for Category 4 LBT, UE determines CAPC based on the associated UCI content.

In one embodiment, a UE establishes a radio bearer with a base station over an unlicensed band. The UE prepares uplink control information (UCI) to be transmitted over a physical uplink control channel (PUCCH) to the base station. The UE performs a listen-before-talk (LBT) procedure using a set of LBT parameters associated with a channel access priority class (CAPC). The UE selects an LBT category for the LBT procedure and determines the CAPC according to content and size of the UCI. The LBT category and the CAPC value are determined based on whether the UCI contains SR, HARQ ACK/NACK, CSI, or any combination of the above. The UE transmits the UCI over the PUCCH upon successfully completing the LBT procedure.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
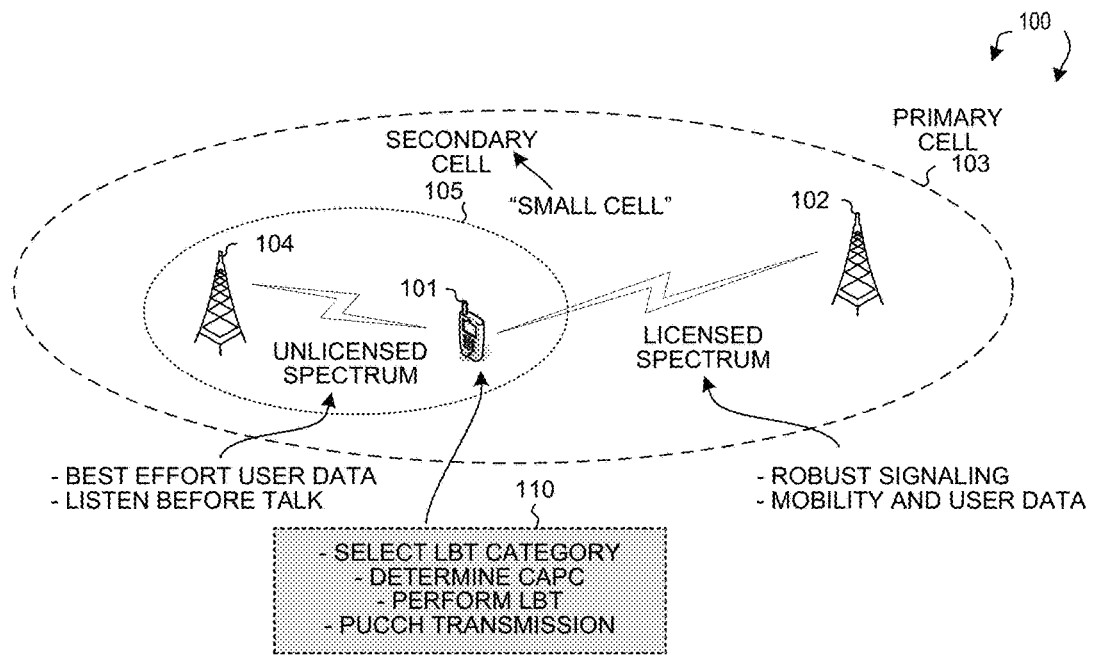
FIG. 1 illustrates an exemplary Licensed Assisted Access (LAA) wireless communications system that adopts Listen Before Talk (LBT) channel access mechanism for physical uplink control channel (PUCCH) transmission in accordance with a novel aspect.

FIG. 1 illustrates an exemplary Licensed Assisted Access (LAA) 5G New Ratio (NR) wireless communications system 100 that adopts listen before talk (LBT) channel access mechanism for Physical Uplink Control Channel (PUCCH) transmission in accordance with embodiments of the current invention. NR wireless communications system 100 includes one or more wireless communication networks, and each of the wireless communication networks has base infrastructure units, such as 102 and 104. The base infrastructure units may also be referred to as an access point, an access terminal, a base station, eNB, gNB, or by other terminology used in the art. Each of the base stations 102 and 104 serves a geographic area. The geographic area served by wireless communications stations 102 and 104 overlaps in this example.

Base station 102 is a licensed base station that communicates with UE 101 via a licensed frequency band. In one example, base station 102 communicates with UE 101 via LTE wireless communication. Base station 102 provides wireless communication to multiple UEs within primary cell 103. Base station 104 is an unlicensed base station that communicates with UE 101 via an unlicensed frequency band. In one example, base station 104 communicates with UE 101 via LTE wireless communication. Base station 104 can communicate with multiple UEs with a secondary cell 105. Secondary cell 105 is also referred to as a "small cell". Note that, FIG. 1 is an illustrative plot. The base station 102 and base station 104 can be co-located geographically.

The exponential growth in data consumption has created large bandwidth demands that cannot be met by current wireless systems. To meet this ever-increasing demand for data, new wireless systems with greater available bandwidth are needed. Licensed Assisted Access (LAA) wireless networks can be used to provide greater available bandwidth. An LAA network utilizes unlicensed frequency bands in addition to licensed frequency bands contemporaneously, thereby provided additional available bandwidth to the UEs in the wireless system. For example, UE 101 can benefit from simultaneous use of the licensed frequency band and the unlicensed frequency band in an LAA network. The LAA network not only provides additional bandwidth for greater overall data communication, but also provide consistent data connectivity due to the presence of two separate data links. Having multiple data links available increases the probability that the UE will be able to achieve proper data communication with at least one base station at any given moment.

Furthermore, while LAA only utilizes the unlicensed spectrum to boost downlink through a process of carrier aggregation, enhanced LAA (eLAA) allows uplink streams to take advantage of the 5 GHz unlicensed band as well. In NR-Unlicensed (NR-U), not only data channel, but control channels such as PUCCH are also transmitted over the 5 GHz unlicensed band. While utilization of the unlicensed spectrum provides more available bandwidth, the use of the unlicensed spectrum faces practical problems that need to be addressed. To facilitate efficient and fair spectrum sharing, a dynamic spectrum sharing mechanism called listen-before-talk (LBT) channel access procedure needs to be followed for all downlink and uplink transmission in NR-U, as unlicensed frequencies are also used by other networks such as WiFi.

3GPP has classified different LBT schemes according to four different LBT categories. The selection of LBT categories goes hand-in-hand with determining a suitable Channel Access Priority Class (CAPC). 3GPP has introduced four different channel access priority classes for LTE LAA. Naturally, selecting the proper LBT type and determining a suitable CAPC is very important for transmission and reception of control messages in NR-U. PUCCH is the uplink physical channel that carries UCI (Uplink Control Information). Major information transmitted over PUCCH are: (a) Scheduling Request (SR), (b) ACK/NAK (when no UL data to transmit), and (c) Channel State Information (CSI) Report (periodic). 3GPP has defined multiple PUCCH formats for carrying SR, HARQ Ack/NACK, and CSI Report or a combination of these information. The size of the UCI also varies from one format to another.

In accordance with one novel aspect, a method is provided for UE to select a suitable LBT category and to determine an efficient CAPC for PUCCH transmission in NR-U wireless communication network. In the example of FIG. 1, UE 101 is connected with gNB 104 over unlicensed band, and UE 101 needs to transmit uplink control information (UCI) to gNB 104 over a PUCCH. As depicted by 110, UE first selects a suitable LBT category and then determines an efficient CAPC for the PUCCH transmission based on the UCI size and content. UE 101 then performs an LBT procedure under the selected LBT category using a set of LBT parameters associated with the determined CAPC value. Upon successfully completing the LBT procedure, UE 101 then transmits the UCI to gNB 104 over the PUCCH. In one embodiment, UE 101 selects Category 4 LBT for all PUCCH transmissions because Category 4 LBT offers fairness with other unlicensed network nodes (e.g., WiFi). In another embodiment, UE 101 selects either Category 4 LBT or Category 2 LBT or a mix of Category 2 and Category 4 for PUCCH transmission depending on the PUCCH format. In yet another embodiment, for Category 4 LBT procedure, UE 101 determines the proper CAPC value based on the associated UCI size and content.

Figure 2:
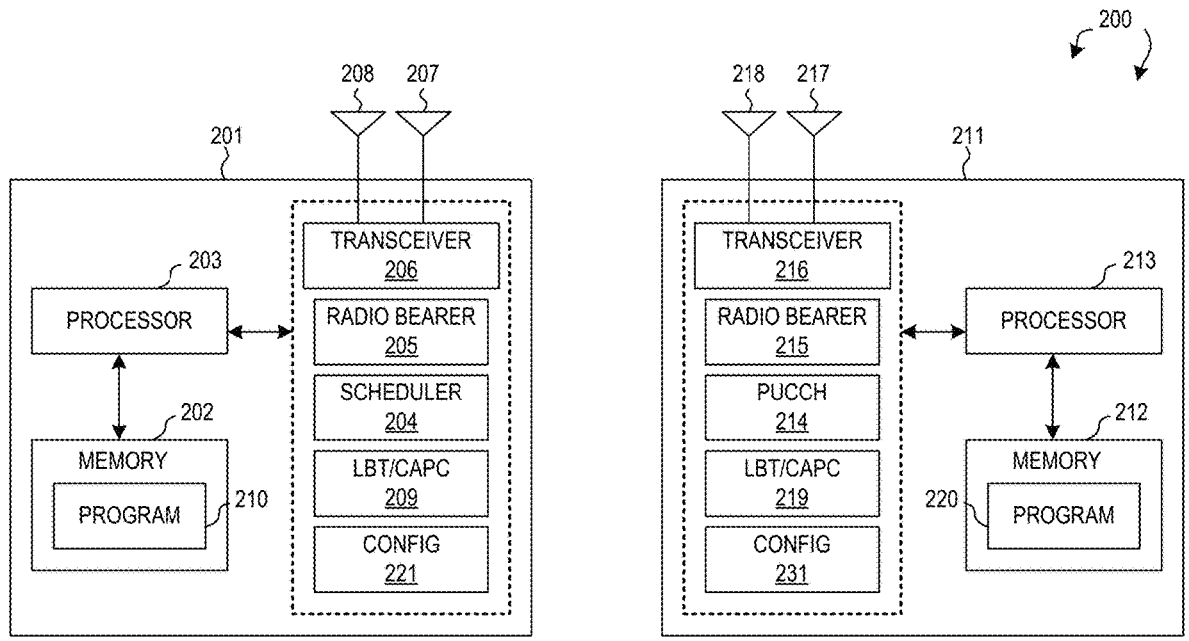
FIG. 2 is a simplified block diagram of a wireless transmitting device and a receiving device in accordance with embodiments of the present invention.

FIG. 2 is a simplified block diagram of wireless devices 201 and 211 in accordance with embodiments of the present invention. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes a radio bearer handling module 205, a scheduler 204, an LBT/CAPC channel access circuit 209, and a configuration circuit 221. Wireless device 211 is a UE that includes a radio bearer handling module 215, a PUCCH/UCI handling module 214, an LBT/CAPC channel access circuit 219, and a configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, the base station 201 establishes a data radio bearer with the UE 211 via radio bearer handing circuit 205, schedules downlink and uplink transmission for UEs via scheduler 204, performs downlink LBT procedure and determines CAPC via channel access circuit 209, and provides configuration information to UEs via configuration circuit 221. The UE 211 establishes a data radio bearer with the base station via radio bearer handing circuit 215, prepares UCI for PUCCH transmission via PUCCH module 214, performs uplink LBT procedure and determines CAPC via channel access circuit 219, and obtains configuration information via configuration circuit 231. In accordance with one novel aspect, UE 211 determines the LBT categories and CAPC levels based on UCI size and content to be transmitted over the PUCCH.

Figure 3:
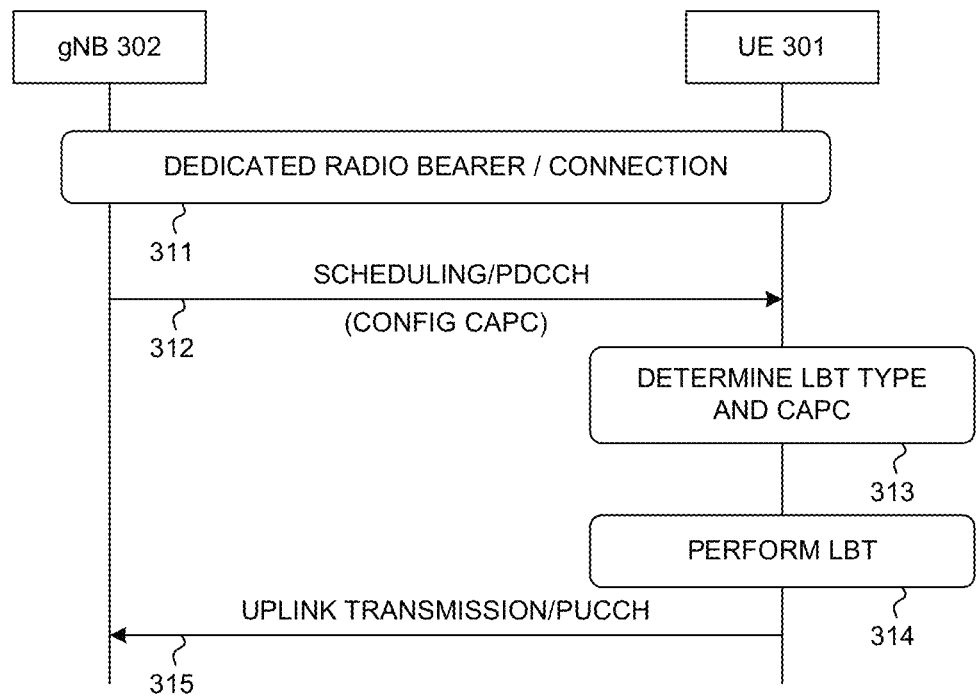
FIG. 3 illustrates a sequence flow between a UE and a base station for scheduling and performing PUCCH transmission using an LBT type and a CAPC value in 5G NR-U in accordance with one novel aspect.

FIG. 3 illustrates a sequence flow between a UE 301 and a base station gNB 302 for scheduling and performing PUCCH transmission using a selected LBT category and a determined CAPC value in NR-U in accordance with one novel aspect. In step 311, gNB 302 and UE 301 establish a dedicated connection with each other. For example, the dedicated connection is a dedicated radio bearer (DRB) associated a quality class identifier (QCI). Each DRB has a one-to-one mapping to a logical channel having a logical channel priority (LCP) value. In step 312, gNB 302 sends uplink scheduling information to UE 301 over a PDCCH. In one example, gNB 302 determines the CAPC value for UE 301 for LBT parameters to be applied in the subsequent uplink transmission. The CAPC value can be determined based on the QCI or LCP associated with the DRB, or determined based on other considerations. The base station can configure the CAPC over the PDCCH. Alternatively, the base station can configure the CAPC as part of the logic channel configuration that is sent to UE 301 via radio resource control (RRC) signaling. In other examples, UE 301 can determine the CAPC value by itself, e.g., based on the QCI or LCP associated with the DRB, without being configured by the network.

In New Radio-Unlicensed (NR-U), any downlink and uplink access have to follow the LBT channel access procedure, as unlicensed frequencies are also used by other networks such as WiFi. In step 313, UE 301 receives the uplink scheduling information and selects an LBT type and a CAPC value. There are four different categories of LBT for accessing a shared wireless medium. Category 1 (No LBT) means no LBT procedure is performed by the transmitting entity. Category 2 (LBT without random backoff) means the duration of time that the channel is sensed to be idle before the transmitting entity transmits is deterministic. For Category 3 (LBT with random backoff with a contention window of fixed size), the transmitting entity draws a random number N within a contention window (CW). The size of the contention window is specified by the minimum and maximum value of N. The size of the contention window is fixed. The random number N is used in the LBT procedure to determine the duration of time that the channel is sensed to be idle before the transmitting entity transmits on the channel. For Category 4 (LBT with random backoff with a contention window of variable size), the transmitting entity draws a random number N within a contention window. The size of the contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. Category 4 LBT takes longer time and has lower success rate as compared to other LBT procedures, but offers fairness with other unlicensed network nodes.

The selection of LBT categories goes hand-in-hand with determining a suitable Channel Access Priority Class (CAPC). 3GPP has introduced four different channel access priority classes for LTE LAA. Table 1 below shows the different priority classes, where the smaller the number of the class, the higher the priority. Each priority class uses different $T_{mcot,p}$, which refers to the maximum channel occupancy time for priority class p. For the priority Classes 3 and 4, $T_{mcot,p}$ is 10 ms, if the absence of any other co-located technology sharing the same spectrum band can be guaranteed on a long-term basis. In a different case, it is limited to 8 ms. According to the 3GPP standards, a device cannot continuously transmit in the unlicensed spectrum for a period longer than $T_{mcot,p}$. In step 314, UE 301 performs uplink LBT channel access procedure using LBT parameters associated with the determined CAPC. In step 315, upon successful LBT completion, UE 301 transmits the UCI to gNB 302 over the PUCCH.

TABLE 1

Different CAPC Defined in 3GPP Standards

| CAPC | $m_p$ | $CW_{min,p}$ | $CW_{max,p}$ | $T_{MCOT,p}$ | Allowed CWp sizes |
|---|---|---|---|---|---|
| 1 | 1 | 3 | 7 | 2 ms | 3, 7 |
| 2 | 1 | 7 | 15 | 3 ms | 7, 15 |
| 3 | 3 | 15 | 63 | 8 or 10 ms | 15, 31, 63 |

TABLE 1-continued

Different CAPC Defined in 3GPP Standards

| CAPC | $m_p$ | $CW_{min,p}$ | $CW_{max,p}$ | $T_{MCOT,p}$ | Allowed CWp sizes |
|---|---|---|---|---|---|
| 4 | 7 | 15 | 1023 | 8 or 10 ms | 15, 31, 63, 127, 255, 511, 1023 |

Figure 4:
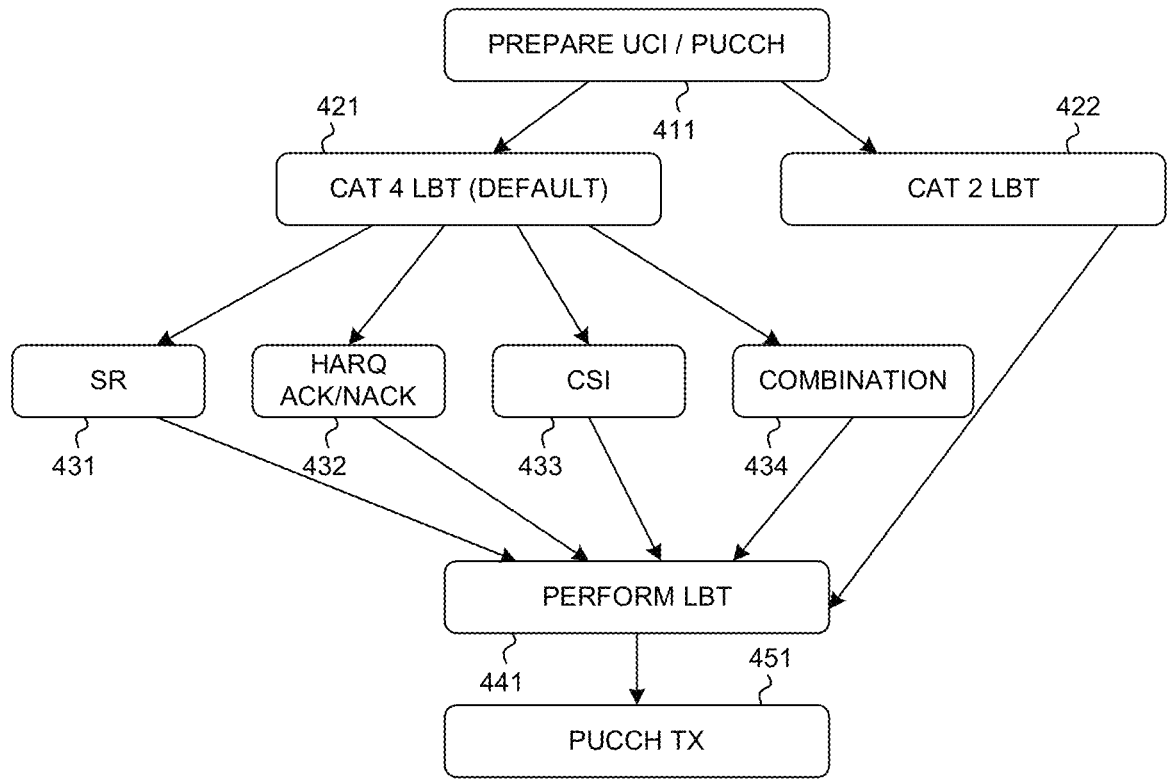
FIG. 4 illustrates embodiments of a UE determining LBT categories and LBT parameters associated with a CAPC value for PUCCH transmission in 5G NR-U.

FIG. 4 illustrates embodiments of a UE determining LBT categories and LBT parameters associated with a CAPC value for PUCCH transmission in NR-U. Selecting the proper LBT type and determining a suitable CAPC is very important for transmission and reception of control messages such as UCI over PUCCH in NR-U. In step 411, UE prepares the UCI to be transmitted over a PUCCH. Major information transmitted over PUCCH are: (a) Scheduling Request (SR), (b) ACK/NAK (when no UL data to transmit), and (c) Channel State Information (CSI) Report (periodic). 3GPP has defined multiple PUCCH formats for carrying SR, HARQ Ack/NACK, and CSI Report or a combination of these information. The size of the UCI also varies from one format to another. 3GPP has defined different formats of PUCCH depending on the size of PUCCH (number of OFDMA symbols) and the size of UCI carried. Table 2 below shows different PUCCH format and its corresponding description.

TABLE 2

PUCCH formats in NRU

| # | PUCCH Format | Format Description |
|---|---|---|
| 1 | Format #0 | Short PUCCH (1 or 2 symbols), small UCI payloads (<2 bits) |
| 2 | Format #1 | Long PUCCH (4~14 symbols), small UCI payloads (<2 bits) |
| 3 | Format #2 | Short PUCCH (1 or 2 symbols), large UCI payloads (>2 bits) |
| 4 | Format #3 | Long PUCCH (4~14 symbols), large UCI payloads (>2 bits) |
| 5 | Format #4 | Long PUCCH (4~14 symbols), moderate UCI payloads (>2 bits) |

LBT category needs to be selected in such a way that it provides fairness with other unlicensed networks such as WiFi. In step 421, UE selects Category 4 LBT as the default LBT type for all PUCCH transmissions as Category 4 LBT offers fairness with other unlicensed network nodes. However, Category 2 LBT can also be used for short PUCCH, carrying small UCI payloads (Format #1), like only SR or HARQ ACK/NACK, if gNB shares the MCOT. Hence, depending on the PUCCH format, UE selects either Category 4 LBT or Category 2 LBT or a mix of Category 2 and Category 4 for PUCCH transmission.

Category 4 LBT requires determination of CAPC, where lower CAPC values reflect higher priority. Once LBT is performed, UE needs to determine the suitable CAPC for corresponding PUCCH transmission. CAPC should be determined depending on the priority of the message, so that higher priority messages are assigned with higher priority CAPC (lower CAPC values). Depending on different PUCCH formats and the associated UCI, different options can be adopted. In step 431, UE determines CAPC when the PUCCH is carrying SR. In a first option, the network (gNB) can explicitly configure the CAPC for UL SR transmission via RRC messages. In a second option, UE can map UL logical channel priority (LCP) values to the CAPC for SR, e.g., higher LCP are assigned with higher CAPC (lower value). In a third option, UE can use UL QCI to determine the CAPC for SR, e.g., high priority QCI are assigned with higher CAPC (lower value).

In step 432, UE determines CAPC when the PUCCH is carrying HARQ ACK/NACK. When DL HARQ decoding fails, UE does not have any information about the DL LCP values. As a result, UE is unable to use the DL LCP values for determining the UL CAPC for HARQ ACK/NACK transmission. Hence, considering the time constraints of small HARQ ACK/NACK message, UE always uses the highest priority CAPC (CAPC=1) for HARQ ACK/NACK transmission. In step 433, UE determines CAPC when the PUCCH carrying CSI. CSI messages are relatively bigger and do not have time constraints. Therefore, the network (gNB) can configure the CAPC for CSI messages. PUCCH can also carry a combination of SR, HARQ ACK/NACK, and CSI. In that case, in step 434, UE determines the CAPC having the strictest requirements, i.e., the highest the priority with the lowest CAPC value—$CAPC_{PUCCH}=\min(C_i)$, where Ci refers to each individual CAPC value for PUCCH carrying SR, HARQ ACK/NACK, and CSI. In step 441, UE performs LBT channel access procedure using a set of LBT parameters associated with the determined CAPC. Finally, in step 451, UE performs PUCCH transmission upon successful LBT completion.

Figure 5:
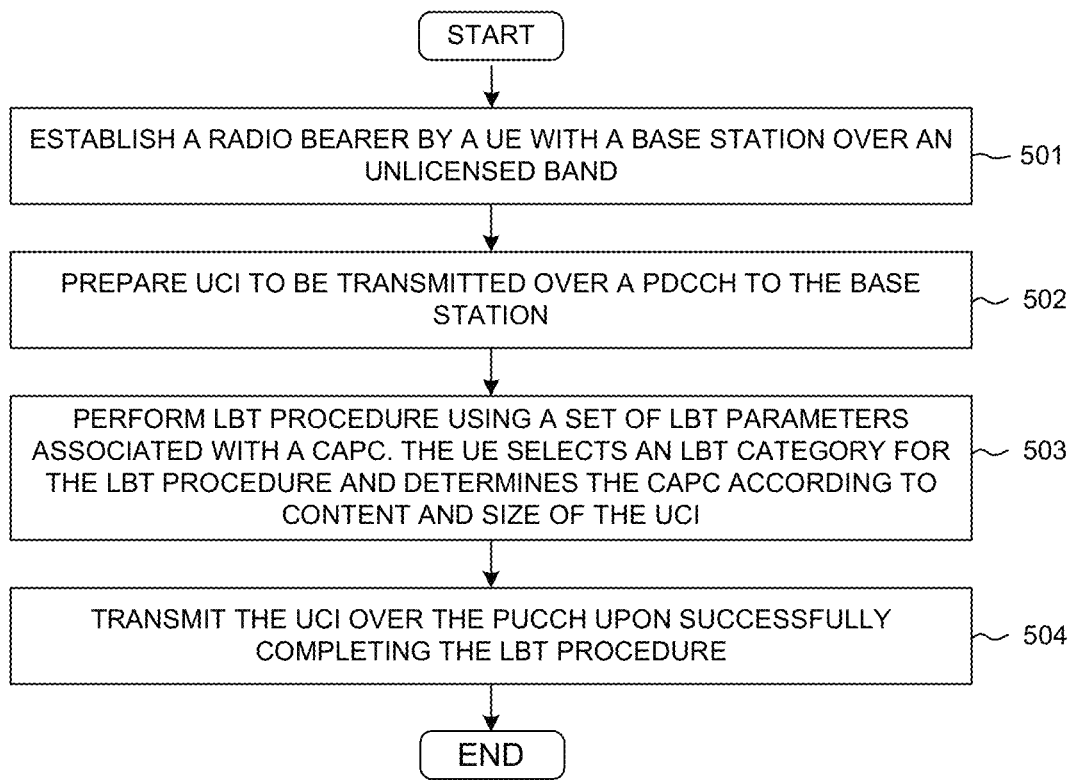
FIG. 5 is flow chart of a method of UE determining LBT categories and suitable Channel Access Priority Class (CAPC) values for PUCCH transmission in 5G NR-U in accordance with one novel aspect.

FIG. 5 is flow chart of a method of UE determining LBT categories and suitable Channel Access Priority Class (CAPC) values for PUCCH transmission in accordance with one novel aspect. In step 501, a UE establishes a radio bearer with a base station over an unlicensed band. In step 502, the UE prepares uplink control information (UCI) to be transmitted over a physical uplink control channel (PUCCH) to the base station. In step 503, the UE performs a listen-before-talk (LBT) procedure using a set of LBT parameters associated with a channel access priority class (CAPC). The UE selects an LBT category for the LBT procedure and determines the CAPC according to content and size of the UCI. In step 504, the UE transmits the UCI over the PUCCH upon successfully completing the LBT procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    establishing a radio bearer by a user equipment (UE) with a base station over an unlicensed band;
    preparing uplink control information (UCI) to be transmitted over a physical uplink control channel (PUCCH) to the base station;
    performing a listen-before-talk (LBT) procedure using a set of LBT parameters associated with a channel access priority class (CAPC), wherein the UE selects an LBT category for the LBT procedure and determines the CAPC according to content and size of the UCI; and
    transmitting the UCI over the PUCCH upon successfully completing the LBT procedure.

2. The method of claim 1, wherein a Category 4 LBT is selected as a default LBT category.

3. The method of claim 1, wherein the selected LBT category is Category 4, or Category 2, or a combination of Category 4 and Category 2.

4. The method of claim 1, wherein the UCI comprises at least one component of a scheduling request (SR), a hybrid automatic repeat transmission (HARQ) ACK/NACK, a channel state information (CSI) feedback.

5. The method of claim 4, wherein the UCI contains the SR component, and wherein the CAPC for the UCI is determined based on a priority of a logical channel associated with the radio bearer.

6. The method of claim 4, wherein the UCI contains the SR component, and wherein the CAPC for the UCI is determined based on a QoS profile of the radio bearer that includes a quality class identifier (QCI).

7. The method of claim 4, wherein the UCI contains the SR component, and wherein the CAPC for the UCI is explicitly configured by the base station.

8. The method of claim 4, wherein the UCI contains the HARQ ACK/NACK, and wherein the CAPC for the UCI is assigned with the highest priority.

9. The method of claim 4, wherein the UCI contains the CSI feedback, and wherein the CAPC for the UCI is explicitly configured by the base station.

10. The method of claim 4, wherein the UCI contains a combination of the SR, the HARQ ACK/NACK, and the CSI feedback, and wherein the CAPC for the UCI is selected to have the highest priority corresponding to the different UCI components.

11. A User Equipment (UE), comprising:
a radio bearer handling circuit that establishes a radio bearer by a user equipment (UE) with a base station over an unlicensed band;
a physical uplink control channel (PUCCH) handling circuit that prepares uplink control information (UCI) to be transmitted over a PUCCH to the base station;
a listen-before-talk (LBT) handling circuit that performs an LBT procedure associated with a channel access priority class (CAPC), wherein the UE selects an LBT category and determines the CAPC according to content and size of the UCI; and
a transmitter that transmits the UCI over the PUCCH upon successfully completing the LBT procedure.

12. The UE of claim 11, wherein a Category 4 LBT is selected as a default LBT category.

13. The UE of claim 11, wherein the selected LBT category is Category 4, or Category 2, or a combination of Category 4 and Category 2.

14. The UE of claim 11, wherein the UCI comprises at least one component of a scheduling request (SR), a hybrid automatic repeat transmission (HARQ) ACK/NACK, a channel state information (CSI) feedback.

15. The UE of claim 14, wherein the UCI contains the SR component, and wherein the CAPC for the UCI is determined based on a priority of a logical channel associated with the radio bearer.

16. The UE of claim 14, wherein the UCI contains the SR component, and wherein the CAPC for the UCI is determined based on a QoS profile of the radio bearer that includes a quality class identifier (QCI).

17. The UE of claim 14, wherein the UCI contains the SR component, and wherein the CAPC for the UCI is explicitly configured by the base station.

18. The UE of claim 14, wherein the UCI contains the HARQ ACK/NACK, and wherein the CAPC for the UCI is assigned with the highest priority.

19. The UE of claim 14, wherein the UCI contains the CSI feedback, and wherein the CAPC for the UCI is explicitly configured by the base station.

20. The UE of claim 14, wherein the UCI contains a combination of the SR, the HARQ ACK/NACK, and the CSI feedback, and wherein the CAPC for the UCI is selected to have the highest priority corresponding to the different UCI components.

* * * * *